United States Patent
Setomoto et al.

(10) Patent No.: US 9,372,475 B2
(45) Date of Patent: Jun. 21, 2016

(54) WIRELESS CONTROL SYSTEM

(75) Inventors: Tatsumi Setomoto, Osaka (JP); Toru Okazaki, Osaka (JP); Tamotsu Ando, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 156 days.

(21) Appl. No.: 14/344,331

(22) PCT Filed: Sep. 5, 2012

(86) PCT No.: PCT/JP2012/005639
§ 371 (c)(1),
(2), (4) Date: Mar. 12, 2014

(87) PCT Pub. No.: WO2013/038620
PCT Pub. Date: Mar. 21, 2013

(65) Prior Publication Data
US 2014/0340190 A1      Nov. 20, 2014

(30) Foreign Application Priority Data

Sep. 13, 2011   (JP) ................................. 2011-199111

(51) Int. Cl.
| | | |
|---|---|---|
| G05B 23/02 | (2006.01) | |
| G05B 1/01 | (2006.01) | |
| G08C 17/02 | (2006.01) | |
| H05B 37/02 | (2006.01) | |

(52) U.S. Cl.
CPC ........ *G05B 1/01* (2013.01); *G08C 17/02* (2013.01); *H05B 37/029* (2013.01); *H05B 37/0227* (2013.01); *H05B 37/0272* (2013.01); *G08C 2201/20* (2013.01)

(58) Field of Classification Search
CPC ............... H04L 12/2803; H04L 2012/285; B60R 16/0315; B61L 7/088; G08C 17/02
USPC ............. 340/2.24, 2.26, 12.52, 12.22, 12.51, 340/635, 636.12, 636.15; 709/208, 209; 700/115, 116, 117, 124; 362/4, 5, 13, 362/16, 18, 227, 236, 240, 249.05, 276
See application file for complete search history.

(56) References Cited

U.S. PATENT DOCUMENTS

| | | | |
|---|---|---|---|
| 6,859,644 B2 * | 2/2005 | Wang ................. | H05B 37/0245 315/153 |
| 2005/0083224 A1* | 4/2005 | Autret .................... | G08C 19/28 341/176 |
| 2010/0328946 A1* | 12/2010 | Borkar ............... | H05B 33/0845 362/249.02 |

FOREIGN PATENT DOCUMENTS

| | | |
|---|---|---|
| JP | 2005-518133 | 6/2005 |
| JP | 2010-213045 | 9/2010 |
| JP | 2010213045 A * | 9/2010 |
| JP | 2010-226664 | 10/2010 |
| JP | 2011-009717 | 1/2011 |

OTHER PUBLICATIONS

International Search Report in PCT/JP2012/005639, mail date is Oct. 23, 2012.

* cited by examiner

*Primary Examiner* — George Bugg
*Assistant Examiner* — Anthony D Afrifa-Kyei
(74) *Attorney, Agent, or Firm* — Greenblum & Bernstein, P.L.C.

(57) ABSTRACT

In a lighting system, each lamp has a wireless circuit that realizes: a time measuring unit measuring the elapsed time period since the lamp is turned on by a wall switch; a specifying unit specifying a plurality of electrical devices wired to the wall switch according to the elapsed time period measured by each time measuring unit; an identification information assigning unit assigning same identification information to the plurality of lamps specified by the specifying unit as being wired to the same wall switch; and a registration unit registering a Net-ID of a remote control.

11 Claims, 12 Drawing Sheets

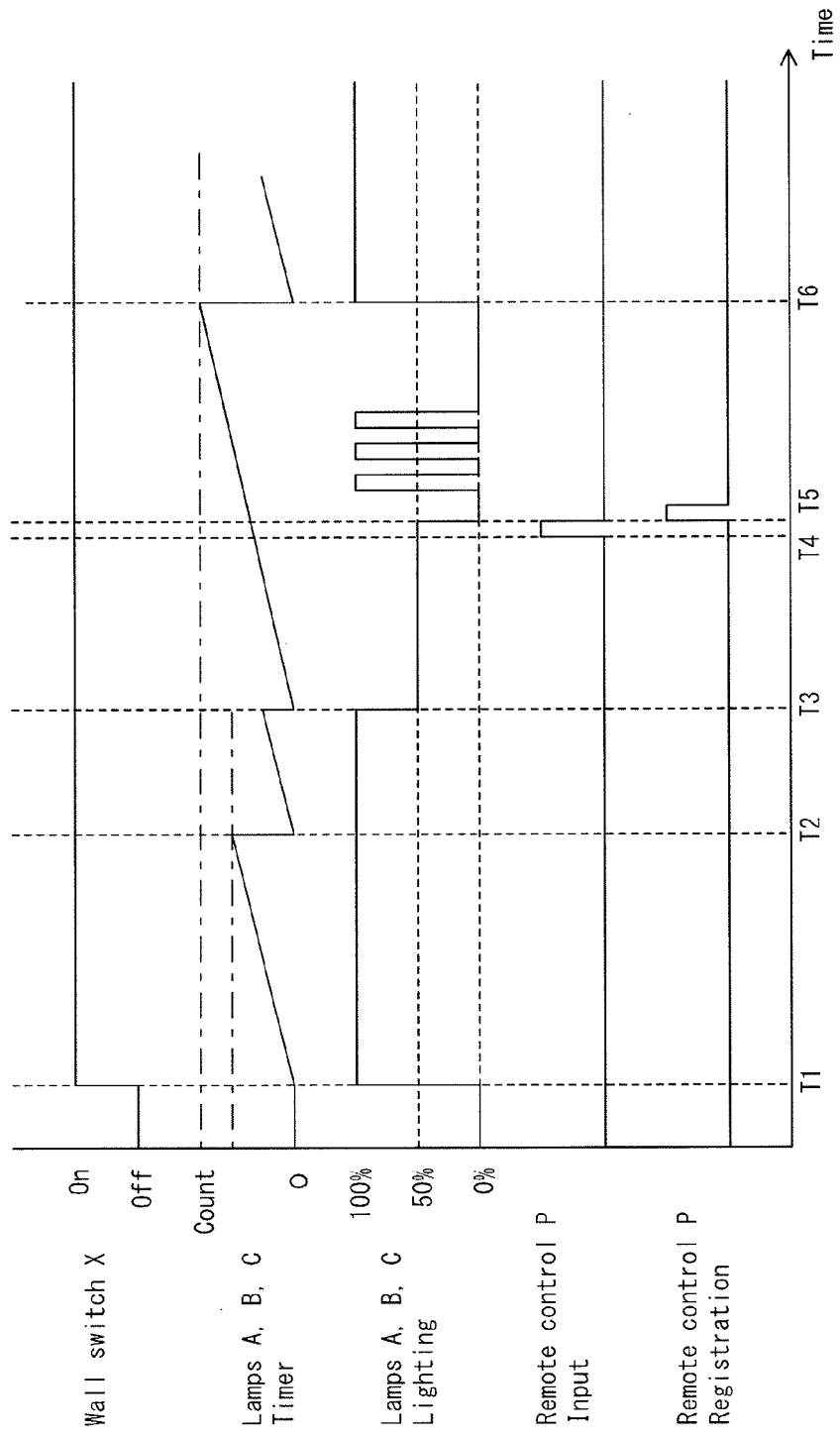

FIG. 7A | Control information | ESS-ID | Signal information | FCS

FIG. 7B | Control information | Sender PAN-ID | Signal information | FCS

FIG. 7C | Control information | Sender PAN-ID | Sender Net-ID | Signal information | FCS FIG. 7D | Control information | Destination Net-ID | Sender Net-ID | Signal information | Timer measurement value | FCS FIG. 7E | Control information | Destination Net-ID | Sender Net-ID | Signal information | FCS FIG. 7F | Control information | Sender Net-ID | Signal information | FCS

WIRELESS CONTROL SYSTEM

TECHNICAL FIELD

The present invention relates to a wireless control system, and in particular to a technology of assigning numbers to, for example, lamps to be controlled, by using a remote control device.

BACKGROUND ART

Large-scale facilities such as halls are commonly equipped with a plurality of lamps. In many cases, the plurality of lamps are divided in several groups (e.g. two groups), and the lamps in a same group are wired to a common wall switch so that each group of lamps can be turned on or off individually. For example, as shown in FIG. 12, a plurality of lamps may be divided in: a group of lamps wired to a first wall switch X; and a group of lamps wired to a second wall switch Y which is different from the first wall switch X, so that each group of lamps can be turned on or off individually. With this structure, it is possible to turn on a necessary minimum number of lamps from among the plurality of lamps, and to thereby reduce the power consumption. In addition, it is possible to change the brightness of the facility by, for example, turning on only the first wall switch X, or turning on both the first wall switch X and the second wall switch Y.

Meanwhile, there has been a proposal of a lamp that is controllable by a radio signal transmitted by a remote control device (hereinafter "remote control") (cf. Patent Literature 1). Generally, such a lamp has identification information (ID) assigned after the lamp has been attached to a lighting fixture, for example. After the assignment, the lamp is controlled to be turned on or off by a radio signal output by the remote control to the lamp having the ID. This identification information can be a single number (PAN-ID) shared among a plurality of lamps, or a plurality of numbers assigned one-to-one to a plurality of lamps.

CITATION LIST

Patent Literature

[Patent Literature 1] Japanese Patent Application Publication No. 2011-9717

SUMMARY OF INVENTION

Technical Problem

To increase convenience, the lamp discussed in Patent Literature 1 may be used as the above-described lamps in a large-scale facility, so that all the lamps wired to the first wall switch X can be turned on or off by a first remote control P, and all the lamps wired to the second wall switch Y can be turned on or off by a second remote control Q which is different from the first remote control P.

If this is the case, it is necessary to assign an ID to each of the lamps at the beginning of the use of the lamps. Specifically, first, the first remote control P outputs an ID for identifying a lamp, and then the lamp receives the ID output by the first remote control P and stores the ID in the memory of the lamp. The ID is thus assigned to the lamp.

As shown in FIG. 12, this assignment of the ID to the lamp is performed by bringing the first remote control P close to the lamp (e.g. locating the remote control within the 10 cm range of the built-in antenna of the lamp) and then sending a radio signal including the ID to the lamp from the first remote control P.

According to this method, however, it is necessary at the beginning of the use to take the steps of: first, examining the routing of the wires extended from the first wall switch X in order to find the correspondence between the wires and the lamps wired to the first wall switch X; and then bringing the first remote control P close to each of the lamps wired to the first wall switch X in order to store the PAN-ID in each lamp. It would be not easy to bring the first remote control P close to each lamp, particularly when the lamps are provided at a height. In addition, when the lamps wired to the wall switch Y are also placed under the on-off control by the second remote control Q, the same steps need to be taken.

Although the case described above assumes that a plurality of wirelessly-controllable lamps are provided in a large-scale facility, the same problem as described above arises when a plurality of other kinds of wirelessly-controllable electrical devices (e.g. air conditioners) are provided.

The present invention is made to solve the problem described above, and aims to provide a wireless control system capable of facilitating the assignment of identification information to electrical devices to be placed under the control of a remote control device.

Solution to Problem

To achieve the aim, the present invention provides a wireless control system comprising: a plurality of electrical devices each having wireless transmission and reception functions; a remote control device wirelessly connected to, and controlling driving of, the plurality of electrical devices; and a plurality of power switches wired to, and turning on or off, the plurality of electrical devices, wherein each electrical device comprises: a time measuring unit configured to measure an elapsed time period since the electrical device is turned on by a power switch among the plurality of power switches; a specifying unit configured to specify, from among the plurality of electrical devices, another electrical device wired to the same power switch as the electrical device according to the elapsed time period measured by the time measuring unit of the electrical device and an elapsed time period since each of the rest of the plurality of electrical devices is turned on by any of the plurality of power switches; an identification information assigning unit configured to assign identification information to said another electrical device specified as being wired to the same power switch as the electrical device, the identification information distinguishing said another electrical device from electrical devices connected to any other power switch among the plurality of power switches; and a registration unit configured to register the identification information assigned by the identification information assigning unit and identification information of the remote control device in association with each other.

Advantageous Effects of Invention

With the stated structure, the time measuring unit and the specifying unit specify the plurality of electrical devices according to the elapsed time from the powering on by the power supply switches, and the identification information assigning unit assigns identification information to electrical devices specified by the specifying unit as being wired to the same power supply switch in order to distinguish them from other electrical devices wired to any other power supplying switch. Therefore, by simply turning on the power supply switch, all the electrical devices wired to the power supply switch and turned on with the same timing are grouped by the identification information. Consequently, it is unnecessary to assign identification information to each of the electrical devices. Therefore, the stated structure facilitates the assignment, to the electrical devices wired to the same power supply switch, of the identification information which is necessary for the control by the remote control device.

At least one of the plurality of electrical devices may serve as a master device that registers the identification information of the remote control device by using the registration unit thereof, and each of the rest of the plurality of electrical devices may serve as a slave device.

With the stated structure, only the specifying unit and the identification information assigning unit of the master device perform their processing. Consequently, the stated structure reduces the amount of processing in terms of the entire wireless control system, and reduces the power consumption of the entire wireless control system.

Each electrical device may further comprise: a function determination unit configured to determine whether the electrical device serves as the master device or the slave device.

The specifying unit of each electrical device may include: a time information transmission unit configured to transmit first time information to another electrical device among the plurality of electrical devices, the first time information indicating the elapsed time period measured by the time measuring unit of the electrical device; a time information acquisition unit configured to acquire second time information from said another electrical device, the second time information indicating an elapsed time period since said another electrical device is turned on by any of the plurality of power switches; a difference obtaining unit configured to obtain a difference between the first time information and the second time information; and a determination unit configured to determine whether the difference falls within a reference range, and when the determination unit determines that the difference falls within the reference range, the identification information assigning unit of the electrical device may assign identification information of said another electrical device to the electrical device.

Each of the plurality of electrical devices may be a lamp having the wireless transmission and reception functions.

The difference falling within the reference range may be greater than −1.0 seconds and no greater than 1.0 seconds.

The plurality of electrical devices may constitute a network having a cluster-tree topology or a combination of a cluster-tree topology and another topology.

BRIEF DESCRIPTION OF DRAWINGS

FIG. 6 is a time chart showing operations of the wireless control system pertaining to Embodiment.

FIGS. 7A through 7F show signal formats used in the wireless control system pertaining to Embodiment.

DESCRIPTION OF EMBODIMENTS

Embodiment

<1> Structure

Figure 1:
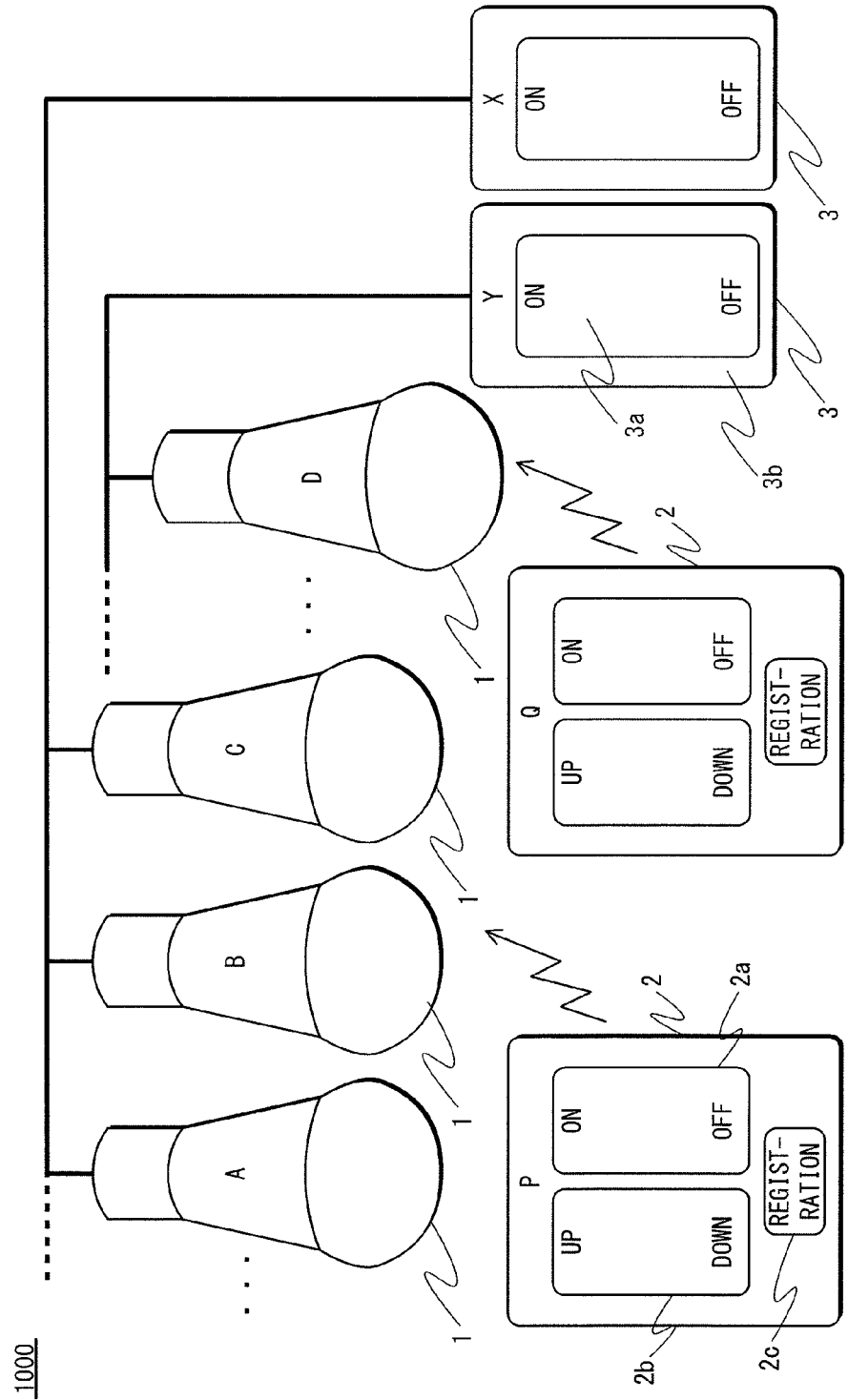
FIG. 1 shows the structure of a wireless control system pertaining to Embodiment.

FIG. 1 shows a lighting system 1000 pertaining to Embodiment.

As shown in FIG. 1, the lighting system 1000 includes a plurality of lamps 1, two remote control devices (hereinafter referred to as "remote controls") 2, and two wall switches 3.

With respect to FIG. 1, note that the plurality of lamps wired to the wall switch X include lamps A, B and C, and the plurality of lamps wired to the wall switch Y include a lamp D. It is assumed that the plurality of lamps wired to the wall switch X are controlled to be turned on or off by the remote control P, and the plurality of lamps wired to the wall switch Y are controlled to be turned on or off by the remote control Q. One of the plurality of lamps is the master device, and the rest are the slave devices (For example, the lamp A is the master device, and the lamps B and C are the slave devices). The plurality of lamps constitute a cluster-tree network topology.

The lamps B and C are controlled to be turned on or off by a control signal output by the lamp A that has received a control signal output by the remote control P.

<1-1> Lamp

<1-1-1> External Structure

Figure 2:
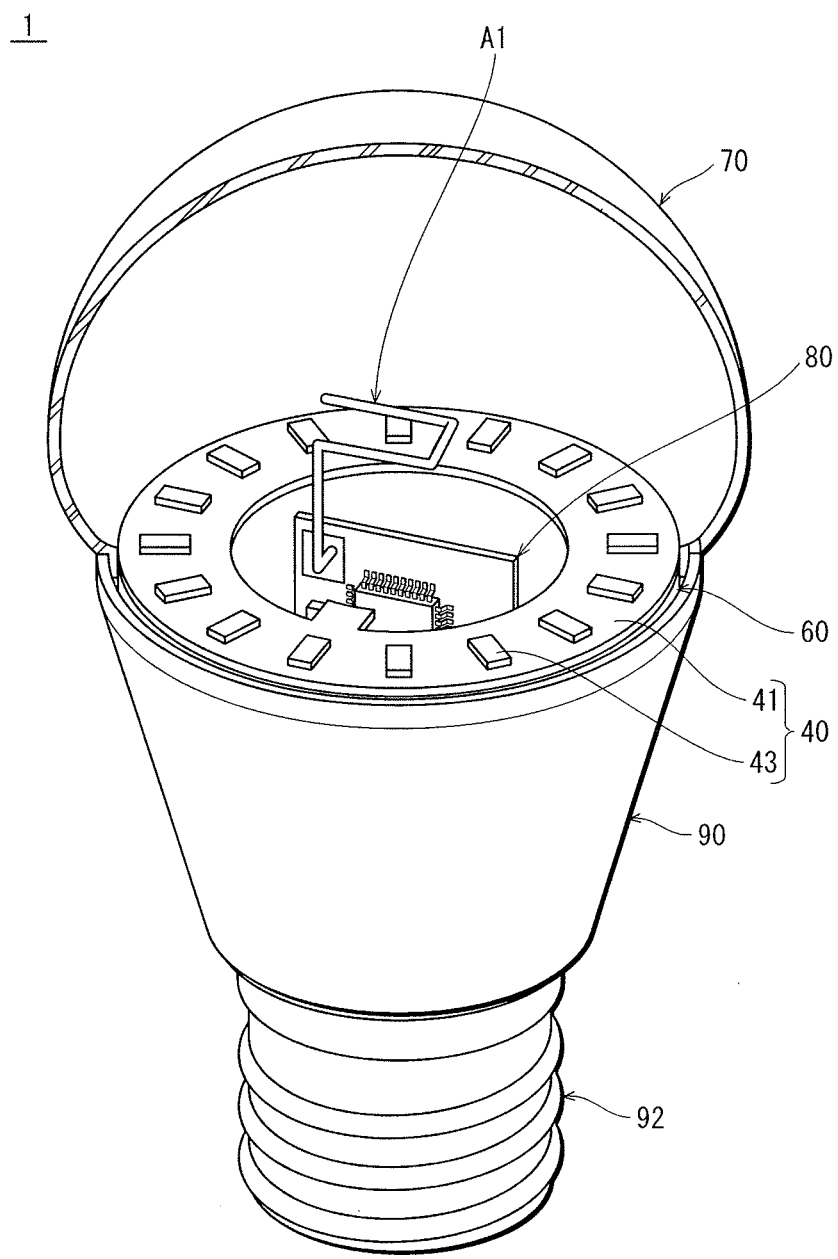
FIG. 2 is a partially-cutaway perspective view of a lamp pertaining to Embodiment.

The following describes the external structure of a lamp 1 pertaining to Embodiment, with reference to FIG. 2.

As shown in FIG. 2, the lamp 1 includes: a light-emitting module 40 having light-emitters 43; a mount 60 to which the light-emitting module 40 is attached; a globe 70 attached to the mount 60 so as to cover the light-emitting module 40; a circuit unit 80 including circuits such as a circuit of a power supply unit for supplying power to the light-emitters 43; a housing 90 in which the circuit unit 80 is disposed; and a base 92 for receiving external power to be supplied to the circuit unit 80.

The light-emitting module 40 has a module substrate 41 having an annular shape in plan view, and a plurality of light-emitters 43 arranged on the module substrate 41 annularly along the circumferential direction of the module substrate 41.

The mount 60 has a substantially annular shape overlapping the module substrate 41 in plan view.

The globe 70 has a shape like a light bulb, and fixed to the mount 60 so as to cover the front side of the module substrate 41.

The circuit unit 80 has an antenna A1. The antenna A1 projects from the module substrate 41 toward the inside space of the globe 70 through an opening provided in the mount 60.

The housing 90 has a cylindrical tube shape having openings at both ends, and tapers from the frontal end to the rear end. As shown in FIG. 2, the mount 60 and the globe 70 are located at one end of the housing 90, and the base 92 is located at the other end of the housing 90.

The base 92 is an Edison screw base. When the lamp 1 is fixed to a lighting fixture, the base 92 receives power from a socket of the lighting fixture.

<1-1-2> Circuit Structure

Figure 3:
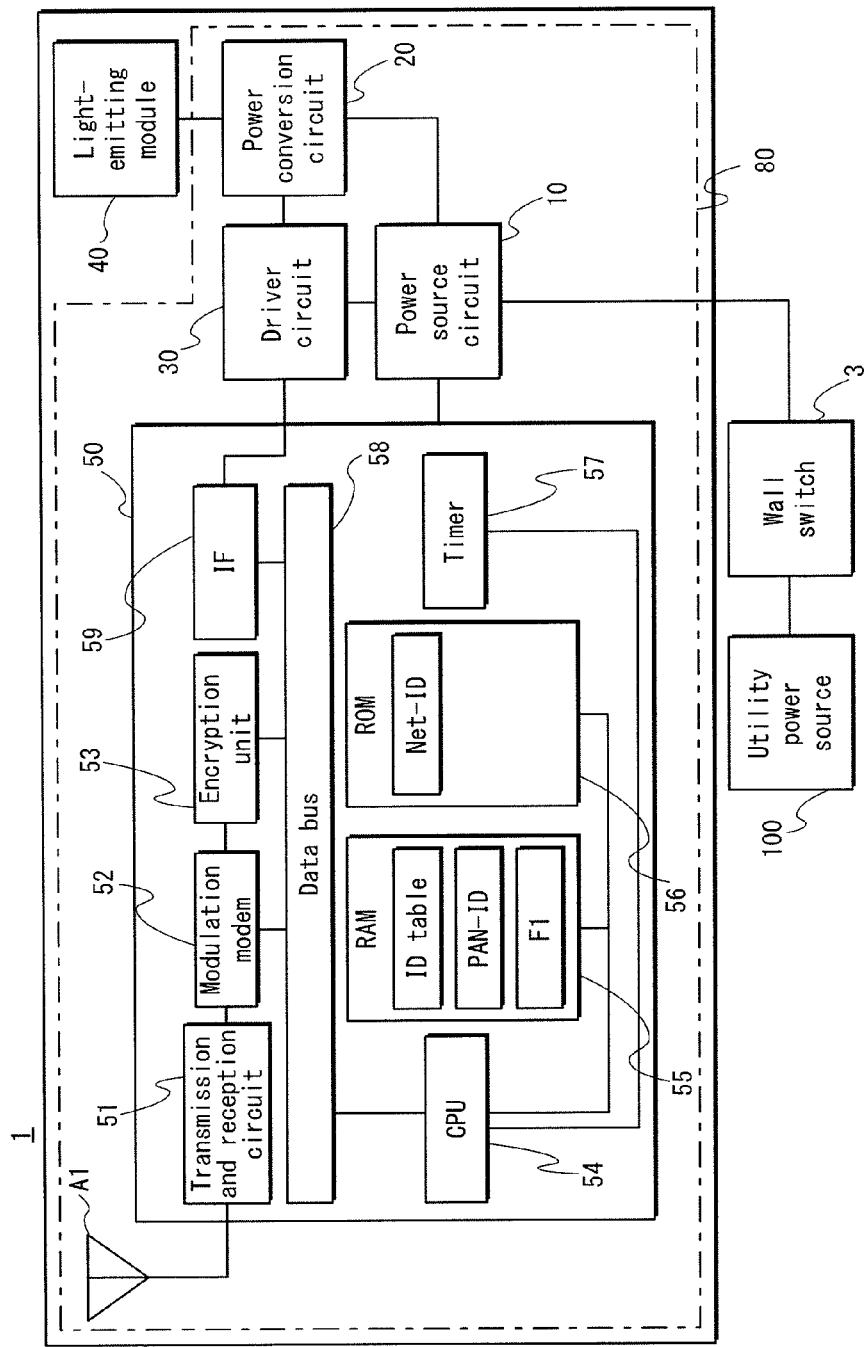
FIG. 3 schematically shows the circuit structure of the lamp pertaining to Embodiment.

The following describes the circuit structure of the lamp 1, with reference to FIG. 3.

As shown in FIG. 3, the lamp 1 has: the circuit unit 80; and the light-emitting module 40 connected to the circuit unit 80 and having the light-emitters 43 to which power is supplied from the circuit unit 80. The lamp 1 is connected to a utility power source 100 via a wall switch 3.

The circuit unit 80 includes: a power source circuit 10; a power converter circuit 20; a driver circuit 30; and a wireless circuit 50.

The power source circuit 10 has a rectifying/smoothing circuit that rectifies and smoothes the alternating current supplied by the utility power source 100 and outputs direct current; and a regulator that is driven by the direct current output from the rectifying/smoothing circuit and supplies a constant direct current power to the driver circuit 30 and the wireless circuit 50. The rectifying/smoothing circuit includes: a diode bridge; and a high-voltage electrolytic capacitor for smoothing the pulsing current output from the diode bridge. The regulator is, for example, a band gap regulator made up from a high-voltage MOS-FET.

The power converter circuit 20 is a DC-DC converter made up of a combination of a switching element, an inductor, and a diode. The switching element as a part of the DC-DC converter is connected to a terminal of the driver circuit 30 that outputs a first control signal. The voltage output by the power converter circuit 20 is controlled by the control signal output by the driver circuit 30.

The driver circuit 30 changes the frequency and the duty ratio of the first control signal according to a second control signal from the wireless circuit 50. Note that the driver circuit 30 is incorporated in a single IC package together with the switching element as a part of the above-described DC-DC converter. Examples of the driver circuit 30 include SSL2108 (with digital brightness control signal) and SSL2101 (with analogue brightness control signal) manufactured by NXP.

The wireless circuit 50 includes: a transmission and reception circuit 51 to which the antenna A1 is connected; a modulation modem 52; an encryption unit 53; a CPU 54; a RAM (Random Access Memory) 55; a ROM (Read Only Memory) 56; a timer 57; data bus 58; and an interface circuit (IF) 59. The wireless signal handled by the wireless circuit 50 uses the 2.4 GHz frequency band, which is available worldwide for communication devices complying with the IEEE (Institute of Electrical and Electronics Engineers) 802.15.4 standards. Note that IEEE 802.15.4 is the name of the standards for short-range wireless networks called PAN (Personal Area Network) or W (Wireless) PAN.

The transmission and reception circuit 51 receives a wireless signal from the outside via the antenna A1, and outputs a wireless signal via the antenna A1. The antenna A1 complies with the standards supporting the wireless signal to be used.

The modulation modem 52 demodulates a digital signal from the transmission and reception circuit 51 and outputs control data, and also inputs control data to the transmission and reception circuit 51.

The encryption unit 53 is made up from a processor having a function of encrypting the control data to be input to the modulation modem 52.

Examples of the wireless circuit 50 described above include JN5142 and JN5148 manufactured by NXP.

<1-2> Remote Control (Remote Control Device)

Figure 4:
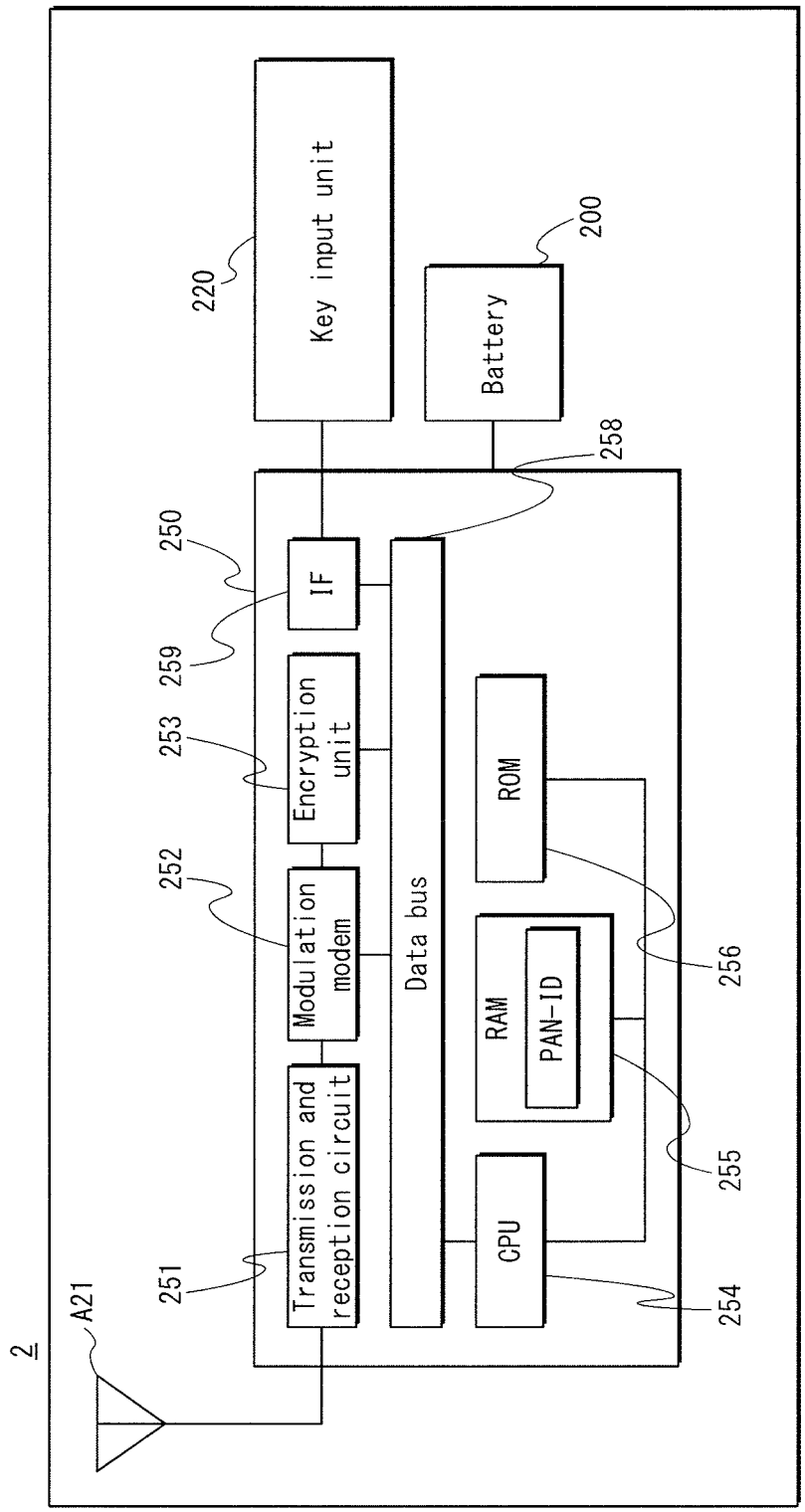
FIG. 4 schematically shows the structure of a remote control device (a remote control) pertaining to Embodiment.

As shown in FIG. 1, the remote control 2 includes: a first switch 2a used for turning on or off the lamp 1; a second switch 2b used for controlling the brightness of the lamp 1; and a third switch 2c used for registration of the PAN-ID of the lamp The following describes the circuit structure of the remote control 2, with reference to FIG. 4.

As shown in FIG. 4, the remote control 2 includes; a battery 200; a key input unit 220; and a wireless circuit 250. The wireless circuit 250 receives direct current power from the battery 200.

The key input unit 220 has contact switches corresponding to the switches 2a, 2b and 2c as shown in FIG. 1. Each contact switch is electrically connected to the wireless circuit 250.

The wireless circuit 250 includes: a transmission and reception circuit 251 to which an antenna A21 is connected; a modulation modem 252; an encryption unit 253; a CPU 254; a RAM (Random Access Memory) 255; a ROM (Read Only Memory) 256; a data bus 258; and an interface circuit (IF) 259. The transmission and reception circuit 251, the modulation modem 252, and the encryption unit 253 are the same as the components described in <1-1-2>, and therefore explanations thereof are omitted.

<1-3> Wall Switch

As shown in FIG. 1, the wall switch 3 includes: a switch handle 3a; a handle plate 3b arranged around the periphery of the switch handle 3a; and a main body (not depicted in the drawing) attached to the wall and holding the switch handle 3a and the handle plate 3b. The wall switch 3 switches between on and off when the user presses a part (with the sign "ON" or "OFF" in FIG. 1) of the switch handle 3a. When the user presses a part (with the sign "ON" in FIG. 1) of the switch handle 3a, electric power is supplied to all the plurality of lamps 1 that are wired to the wall switch 3, and all the plurality of lamps 1 start lighting. When the user presses a part (with the sign "OFF" in FIG. 1) of the switch handle 3a, electric power is shut off from all the plurality of lamps 1 that are wired to the wall switch 3, and all the plurality of lamps 1 stop lighting.

<2> Operations

<2-1> Overall Operations

According to a lighting system pertaining to Embodiment, a same PAN-ID as the identification information is assigned to the plurality of lamps 1 wired to a single wall switch 3. In other words, the same PAN-ID is assigned to the plurality of lamps 1 that are wired to the single wall switch 3 so that the group consisting of the plurality of lamps 1 wired to the same wall switch 3 can be distinguished from other electrical devices wired to another wall switch. Consequently, the plurality of lamps that are wired to the same wall switch 3 are grouped with the same PAN-ID. At the time of factory shipment, each of the plurality of lamps 1 has been assigned a Net-ID that is unique to the product, but has not been assigned the PAN-ID for wireless communications with the remote control 2. The Net-ID is made up from a number that is unique to each product. In other words, different products have different Net-IDs.

In the lighting system 1000 shown in FIG. 1, first, one master device (i.e. the lamp A) and a plurality of slave devices (i.e. the lamps B, C and D) are selected from among the plurality of lamps A, B, C and D. The master device performs the operations for determining the PAN-ID. Here, the lamp A, which has started up first among the lamps A, B and C, serves as the master device. Upon determining the PAN-ID, the master device notifies the PAN-ID to the slave devices. Subsequently, all the lamps A, B and C, which have assigned the same PAN-ID, perform lighting under brightness control. Upon receiving a registration request signal from the remote control P while performing lighting under brightness control, the lamp A stores therein the Net-ID of the remote control P in association with the PAN-ID assigned to the lamps B and C. Thus, all the lamps A, B and C, which have been assigned the same PAN-ID as the remote control P, are associated with each other by the lamp A.

The following explains the operations of the lighting system 1000 pertaining to Embodiment with reference to FIG. 1 and FIGS. 5 through 7.

Figure 5:
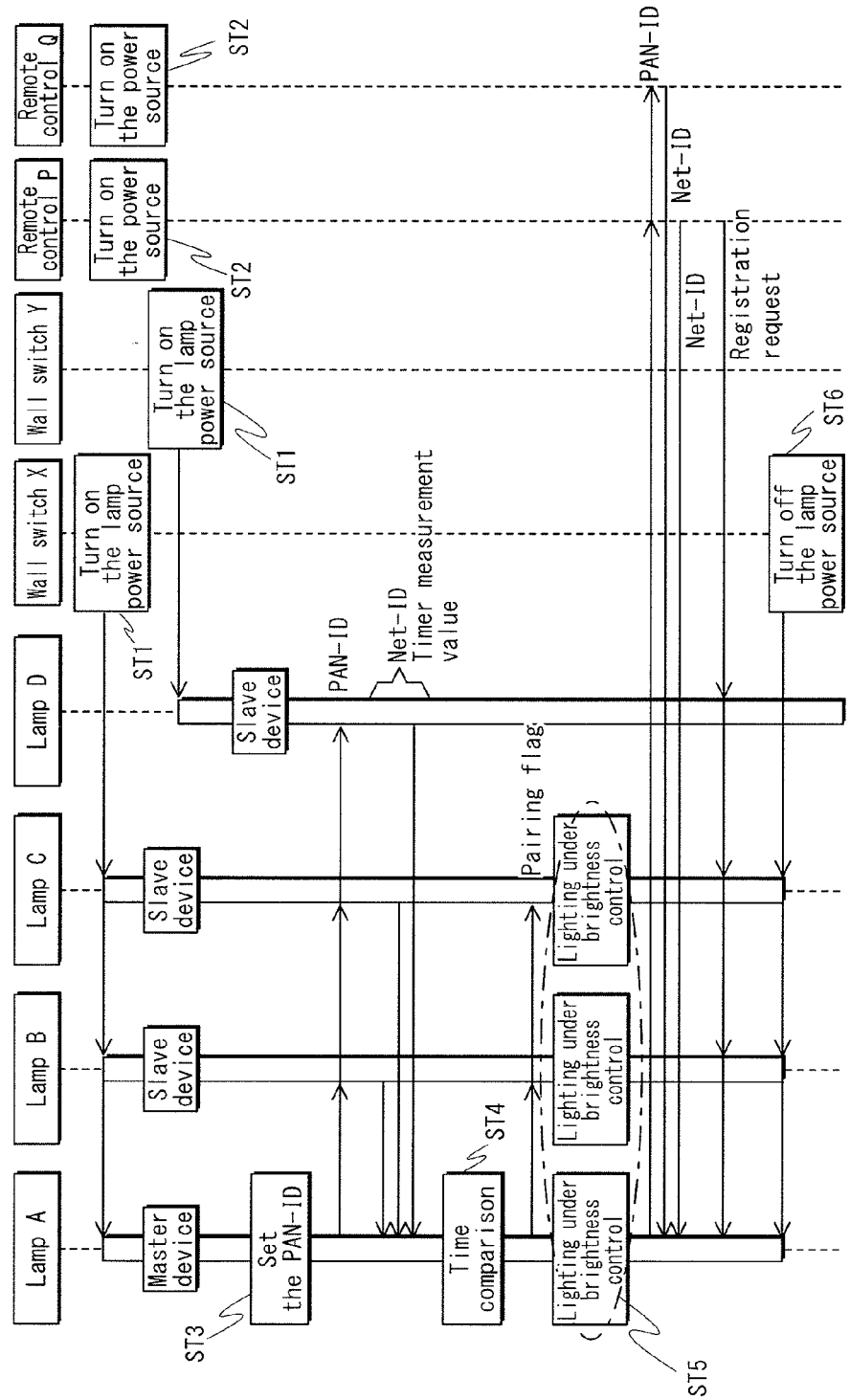
FIG. 5 is a sequence diagram showing operations of a wireless control system pertaining to Embodiment.

First, as shown in FIG. 5 and FIG. 6, when the wall switch X is turned on at time T1 (Step ST1), the lamps A, B and C start lighting. Simultaneously, in the wireless circuit 50 in each of the lamps A, B and C, the timer 57 is turned on and starts measuring the elapsed time period. In the lamp D, the measurement of the elapsed time period is started when the wall switch Y, which is different from the wall switch X, is turned on. In the following, it is assumed that the lamp A has started up first among the lamps A, B and C. On this assumption, the lamp A is the master device, and the lamps B and C are slave devices. The lamp A recognizes that the lamp A has started up earlier than the lamps B and C by recognizing that the lamp A has received beacon signals from the lamps B and C after the lamp A has output a beacon signal.

The lamp A repeatedly outputs a beacon signal. As shown in FIG. 7A, the beacon signal is composed of: control information; an ESS-ID; signal information; and an error detection code FCS. The control information here indicates the beginning of the frames constituting the signal. The ESS-ID is an ID identifying the network to which the lamps A, B and C belong. The signal information is unique information showing that the signal is a beacon signal. The error detection code FCS is a bit sequence used for determining whether an error is contained in the signal.

If there is a wireless LAN access point or the like (not depicted in the drawings) near the lamp A, it broadcasts a first ACK (ACKnowledge) signal in response to the beacon signal. As shown in FIG. 7B, the first ACK signal is composed of: control information; a sender PAN-ID; signal information; and an error detection code FCS. The sender PAN-ID here is identification information for identifying the sender of the first ACK signal. For example, the sender PAN-ID is the PAN-ID of a wireless LAN access point. The signal information is unique information showing that the signal is the first ACK signal. The remote controls P and Q have been previously turned on (Step ST2). However, they do not output the first ACK signal in response to the beacon signal. The lamp D is connected to the wall switch Y, which is different from the wall switch X to which the lamps A, B and C are wired. The lamp D is turned on later than the lamps A, B, and C.

In response to the first ACK signal from the wireless LAN access point or the like, the lamp A detects PAN IDs that are not currently in use (hereinafter referred to as "unused PAN-IDs"), and selects one of the unused PAN-IDs and sets the selected PAN-ID to the lamp A (Step ST3).

Subsequently, at predetermined time (Time T2 in FIG. 6), the lamp A as the master device transmits a PAN-ID information signal, which contains the PAN-ID of the lamp A, to the other lamps, namely the lamps B, C and D. As shown in FIG. 7C, the PAN-ID information signal is composed of: control information; a sender PAN-ID; a sender Net-ID; signal information; and an error detection code FCS. The sender Net-ID here is unique identification information assigned to the lamps A, B, C and D at factory shipment. According to this NET-ID, each of the lamps B, C and D determines whether to fetch the PAN-ID information signal from the lamp A. The sender PAN-ID is identification information for identifying the sender of the PAN-ID information signal, and is the PAN-ID of the lamp A serving as the master device. The signal information is unique information showing that the signal is a provisional PAN-ID information signal. Note that the NET-ID has been stored in the ROM 56 of the lamps A, B, C and D since the factory shipment.

Meanwhile, upon receiving the PAN-ID information signal, each of the lamps B, C and D determines whether or not it has been assigned a PAN-ID, and if determining not, stores therein the PAN-ID contained in the PAN-ID information signal.

After that, each of the lamps B, C and D transmits, to the lamp A, time information signal containing the timer value obtained at the reception of the PAN-ID information signal (Time T2 in FIG. 6). As shown in FIG. 7D, the time information signal is composed of: control information; a destination Net-ID; a sender Net-ID; signal information; a timer value; and an error detection code FCS. The destination Net-ID here is the Net-ID of the lamp A serving as the master device. The sender Net-ID is identification information for identifying the sender of the time information signal, and is the Net-ID of each of the lamps B, C and D serving as the slave devices. The signal information is unique information showing that the signal is the time information signal. The timer value is the measurement value held by the timer 57 of each of the lamps B, C and D at time T2, and represents the time elapsed since the lamps B, C and D are turned on via the wall switches X and Y, to which the lamps are wired.

At time T2, the timer 57 in the wireless circuit 50 of each of the lamps A, B, C and D are reset.

The lamp A performs time comparison, which is processing of comparing its timer value with the timer values contained in the time information signal received from the lamps B, C and D (Step ST4). The time comparison is performed for specifying the lamps connected to the same wall switch X. The lamp A serving as the master device specifies, as the lamps as the slave devices connected to the same wall switch X as the lamp A is connected to, lamps (the lamps B and C) whose timer value falls within a predetermined range of the timer value of the lamp A.

Subsequently, at time T3, the lamp A transmits a pairing flag notification signal to the lamps B and C, which have been specified by the time comparison as the lamps connected to the same wall switch X as the lamp A is connected to. As shown in FIG. 7E, the pairing flag notification signal is composed of: control information; a destination Net-ID; a sender Net-ID; signal information; and an error detection code FCS. The destination Net-ID here is identification information for identifying the destination of the pairing flag notification signal, and is the Net-ID of the lamps B and C specified as the lamps connected to the same wall switch X as the lamp A is connected to. The sender Net-ID is identification information for identifying the sender of the pairing flag notification information, and is the Net-ID of the lamp A serving as the master device. The signal information is unique information showing that the signal is the pairing flag notification signal.

Upon receiving the pairing flag notification signal from the lamp A serving as the master device, the lamps B and C serving as the slave devices set the pairing flag to "1".

Subsequently, the lamp A as the master device and the lamps B and C as the slave devices perform lighting under brightness control at the same time (Step ST5). Here, the lamps A, B and C perform lighting under brightness control in order to notify the user of the assignment of the same PAN-ID to the lamps A, B and C.

Subsequently, the lamp A outputs the beacon signal while performing lighting under brightness control. In response, the remote controls P and Q broadcast the second ACK signal. As shown in FIG. 7F, the second ACK signal is composed of: control information; a sender Net-ID; signal information; and an error detection code FCS. The sender Net-ID here is identification information for identifying the sender of the remote control response signal, and is the Net-ID of the remote controls P and Q. The signal information is unique information showing that the signal is the second ACK signal. Here, if the pairing flag has been set to "1", the lamps B and C do not accept the second ACK signal. That is, only the lamp A as the master device accepts the second ACK signal.

While the lamps A, B and C are performing lighting under brightness control, when the user presses the switch 2c of the remote control P at time T4, the remote control P broadcasts a registration request signal. As shown in FIG. 7F, the registration request signal is composed of: control information; a sender Net-ID; signal information; and an error detection code FCS. The sender Net-ID here is identification information for identifying the sender of the registration request signal, and is the Net-ID of the remote control P. The signal information is unique information showing that the signal is the registration request signal.

Upon receipt of the registration request signal, the lamp A stores therein the PAN-ID assigned to the lamps B and C in association with the Net-ID of the remote control P as the sender. In this way, the remote control P is associated with the lamp A after the PAN-ID is assigned to the lamp A.

After receiving the registration request signal (at time T5 in FIG. 6), the lamp A starts blinking, and subsequently (at time T6 in FIG. 6), starts continuous lighting. Similarly to the lamp A, the lamps B and C starts continuous lighting after performing lighting under brightness control. Here, the lamps A, B and C perform lighting under brightness control in order to notify the user that the lamp A and the remote control P have been associated with each other. In the present description, when it is stated that a lamp performs "lighting under brightness control", it means, for example, that the lamp emits dim light, the lamp blinks, or the lamp stops lighting. Note that the lamp A may be put under the control of the remote control P immediately after the registration of the Net-ID of the remote control P.

As a result of the series of operations described above, the lamps A, B and C wired to the same wall switch X will be classified into the same group in association with the same PAN-ID, and also, the remote control P and the lamp A will be associated with each other.

<2-2> Operations of Wireless Circuit of Lamp Serving as Master Device

Figure 8:
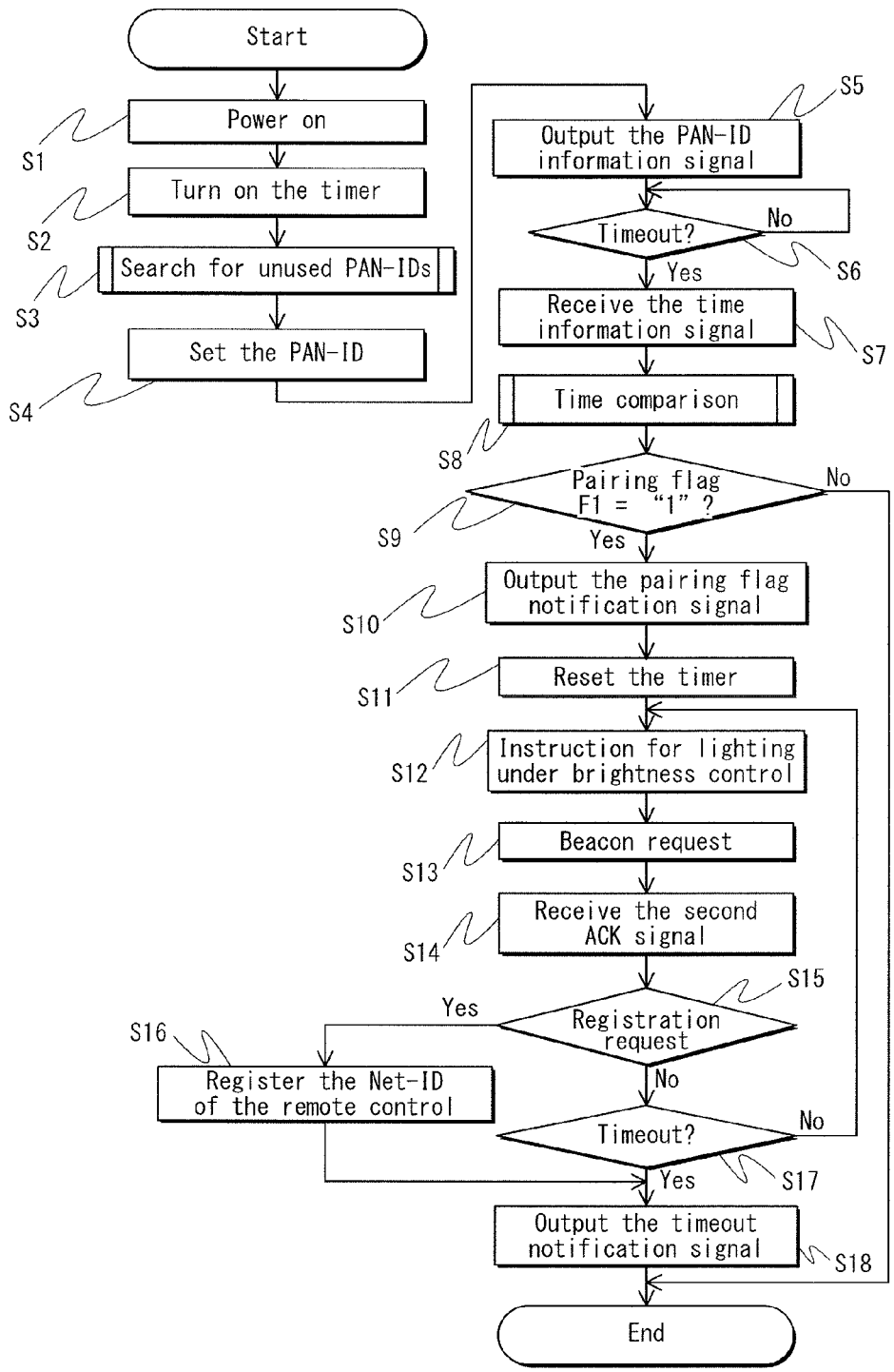
FIG. 8 is a flowchart showing operations of a lamp serving as a master device pertaining to Embodiment.

Referring to FIG. 8, the following describes the operations of the wireless circuit 50 included in the lamp A, which serves as the master device among the lamps A, B and C constituting part of the lighting system 1000. The operations of the wireless circuit 50 are realized by the CPU 54 reading a program stored in the ROM 56, writing the program into the RAM 55, and executing the program.

First, when the wall switch X is turned on and the lamp A is powered on accordingly (Step S1), the timer 57 is turned on and starts measuring the time (Step S2).

Next, the wireless circuit 50 starts searching for unused PAN-IDs, which are PAN-IDs not currently in use (Step S3). The details of the operations for searching for unused PAN-IDs will be described in <2-4>.

Subsequently, the wireless circuit 50 selects one of the unused PAN-IDs detected by the operations of searching for the unused PAN-IDs, and sets the selected PAN-ID as the PAN-ID of the lamp A (Step S4). Specifically, the CPU 54 writes the PAN-ID selected from the detected unused PAN-IDs into the PAN-ID storage area in the RAM 55, which is for storing the PAN-ID to be assigned to the lamp A. This PAN-ID is to be assigned to the lamps B, C and D as well. Therefore, the CPU 54 sends the PAN-ID to the encryption unit 53 and so on via the data bus 58 after converting it to be in the format of the PAN-ID information signal.

Subsequently, the wireless circuit 50 broadcasts the PAN-ID information signal (Step S5).

After that, the wireless circuit 50 determines whether or not the elapsed time period measured by the timer 57 has reached a predetermined time period (e.g. 1 min.) (i.e. whether or not a timeout has occurred) (Step S6). When determining that the timeout has not occurred (Step S6: No), the circuit unit 50 goes into the "waiting" state.

On the other hand, when determining that the timeout has occurred (Step S6: Yes), the wireless circuit 50 receives a time information signal from each of the lamps B, C and D serving as the slave devices (Step S7).

Subsequently, the wireless circuit 50 performs time comparison processing by using the timer measurement values included in the time information signals received from the lamps B, C and D serving as the slave devices (Step S8). As the result of the time comparison processing, the lamps connected to the same wall switch X will be specified. The details of the time comparison processing will be described in <2-5>. Also, the value of the pairing flag F1 stored in the RAM 55 is set by this time comparison processing.

Subsequently, the wireless circuit 50 determines whether or not the pairing flag F1 is set to "1" or not (Step S9).

When determining in Step S9 that the pairing flag F1 is not set to "1" (Step S9: No), the wireless circuit 50 terminates the processing.

On the other hand, when determining in Step S9 that the pairing flag F1 is set to "1" (Step S9: Yes), the wireless circuit 50 transmits a pairing flag notification signal to the lamps B and C, which have been specified in the time comparison processing as the lamps connected to the same wall switch X (Step S10).

Subsequently, the wireless circuit 50 resets the timer 57 (Step S11), and inputs a brightness control instruction signal to the driver circuit 30 (Step S12). This signal serves as an instruction to decrease the brightness of the light to be 50%. Upon receipt of the brightness control instruction signal from the wireless circuit 50, the driver circuit 30 decreases the duty ratio of the control single input to the power converter circuit 20. Consequently, the power input from the power converter circuit 20 to the light-emitting module 40 will be reduced, and accordingly the amount of light emitted by the light-emitting module 40 will be reduced.

Subsequently, the wireless circuit 50 broadcasts a beacon signal (also referred to as "beacon request") (Step S13).

After that, the wireless circuit 50 receives the second ACK signal from the remote controls P and Q (Step S14).

Subsequently, the wireless circuit 50 determines whether or not the remote control P is outputting the registration request signal (Step S15).

When determining in Step S15 that the remote control P is not outputting the registration request signal (Step S15: No), the wireless circuit 50 determines whether or not the elapsed time period measured by the timer 57 has reached a predetermined time period (e.g. 5 min.) (i.e. whether or not a timeout has occurred) (Step S17).

When determining that the timeout has not occurred (Step S17: No), the wireless circuit 50 returns to Step S12. When determining that the timeout has occurred (Step S17: Yes), the wireless circuit 50 outputs a timeout notification signal (Step S18), and then terminates the processing. As shown in FIG. 7E, the timeout notification signal is composed of: control information; a destination Net-ID; a sender Net-ID; signal information; and an error detection code FCS. The destination Net-ID here is identification information identifying the destination of the timeout notification signal, and is the Net-ID assigned to the lamps A, B and C. The sender Net-ID is identification information for identifying the sender of the timeout notification information, and is the Net-ID of the lamp A serving as the master device. The signal information is unique information showing that the signal is the timeout notification signal.

When determining in Step S15 that the remote control P is outputting the registration request signal (Step S15: Yes), the lamp A stores therein the Net-ID of the remote control P (Step S16), blinks upon the completion of the association, and outputs the timeout notification signal. Simultaneously, the lamp A transmits the PAN-ID to the remote control P having the Net-ID thus stored. In addition, the lamp A stores therein a flag indicating that the remote control P is also associated with the lamp A. When the flag is on, the lamp A does not respond to broadcast signals from other lamps. The same applies to both the master device and the slave devices.

<2-3> Operations of Wireless Circuit of Lamp Serving as Slave Device

Figure 9:
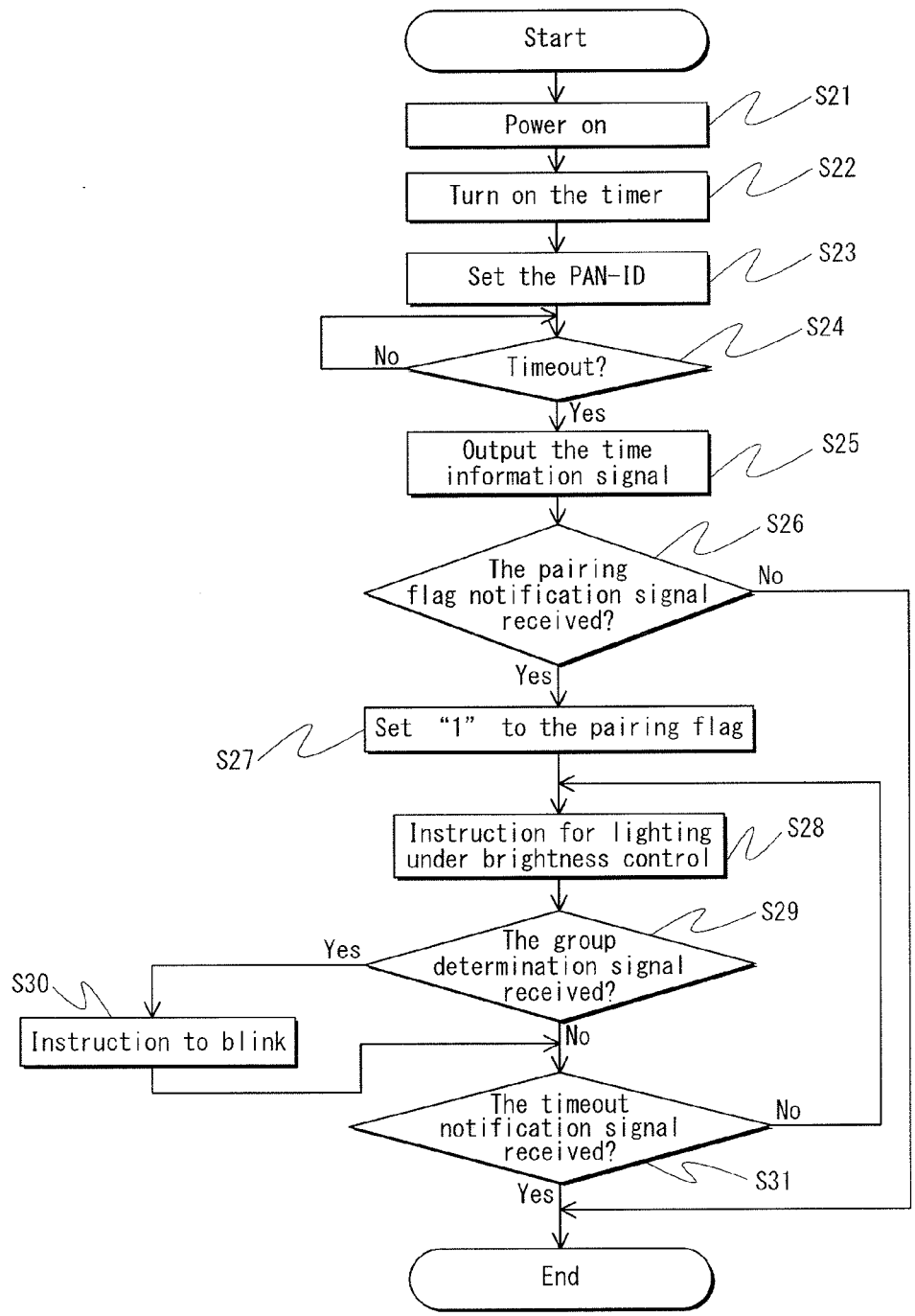
FIG. 9 is a flowchart showing operations of a lamp serving as a slave device pertaining to Embodiment.

Referring to FIG. 9, the following describes the operations of the wireless circuit 50 included in each of the lamps B and C, which serve as the slave devices among the lamps A, B and C constituting part of the lighting system 1000. The operations of the wireless circuit 50 are realized by the CPU 54 reading a program stored in the ROM 56, writing the program into the RAM 55, and executing the program.

First, when the wall switch X is turned on and the lamps B and C are accordingly powered on (Step S21), the timer 57 is turned on and starts measuring the time (Step S22).

Next, the wireless circuit 50 acquires the PAN-ID contained in the PAN-ID information from the lamp A serving as the master device, and sets the PAN-ID to the lamp to which the wireless circuit 50 belongs, as the PAN-ID of the lamp (Step S23).

After that, the wireless circuit 50 determines whether or not the elapsed time period measured by the timer 57 has reached a predetermined time period (e.g. 1 min.) (i.e. whether or not a timeout has occurred) (Step S24). This time period is equal to the time period for the lamp A serving as the master device.

When determining that the timeout has not occurred (Step S24: No), the circuit unit 50 goes into the "waiting" state.

On the other hand, when deter mining in Step S24 that the timeout has occurred (Step S24: Yes), the wireless circuit 50 transmits time information signal to the lamp A serving as the master device (Step S25).

Subsequently, the wireless circuit 50 determines whether or not the wireless circuit 50 the pairing flag notification signal has been received from the lamp A serving as the master device (Step S26).

When determining in Step S26 that the pairing flag notification signal has not been received from the lamp A serving as the master device (Step S26: No), the wireless circuit 50 terminates the processing.

On the other hand, when determining in Step S26 that the pairing flag notification signal has been received from the lamp A serving as the master device (Step S26: Yes), the wireless circuit 50 sets the pairing flag to "1", which indicates that the lamp belongs to the same group as the lamp A and serves as the slave device (Step S27).

Subsequently, the wireless circuit 50 inputs a brightness control instruction signal to the driver circuit 30 (Step S28). This signal serves as an instruction to decrease the brightness of the light to be 50%. Upon receipt of the brightness control instruction signal from the wireless circuit 50, the driver circuit 30 decreases the duty ratio of the control single input to the power converter circuit 20. Consequently, the power input from the power converter circuit 20 to the light-emitting module 40 will be reduced, and accordingly the amount of light emitted by the light-emitting module 40 will be reduced.

Subsequently, the wireless circuit 50 determines whether or not the wireless circuit 50 has received a group determination signal from the lamp A serving as the master device (Step S29).

When determining in Step S29 that the group determination signal has not been received from the lamp A serving as the master device (Step S29: No), the wireless circuit 50 determines whether the timeout notification signal has been received from the lamp A serving as the master device (Step S31).

When determining in Step S31 that the timeout notification signal has not been received from the lamp A serving as the master device (Step S31: No), the wireless circuit 50 returns to Step S28.

On the other hand, when determining in Step S31 that the timeout notification signal has been received from the lamp A serving as the master device (Step S31: Yes), the wireless circuit 50 terminates the processing.

When determining in Step S29 that the group determination signal has been received from the lamp A serving as the master device (Step S29: Yes), the wireless circuit 50 inputs a blink instruction signal to the driver circuit 30 (Step S30). The brink instruction signal serves as an instruction to blink. Upon receipt of the blink instruction signal from the wireless circuit 50, the driver circuit 30 cyclically changes the duty ratio of the control single input to the power converter circuit 20. Consequently, the power input from the power converter circuit 20 to the light-emitting module 40 will be cyclically changed, and accordingly the amount of light emitted by the light-emitting module 40 will be cyclically changed. Thus, the lamps B and C blink. After that, the wireless circuit 50 moves to Step S31.

<2-4> Operations for Searching for Unused PAN-IDs

Figure 10:
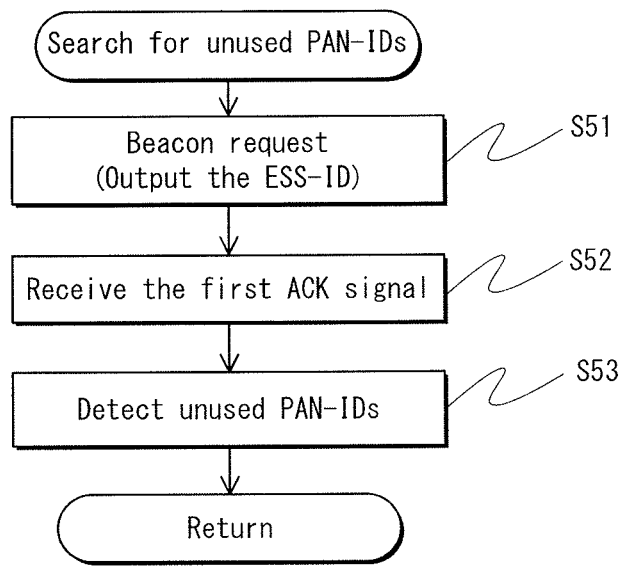
FIG. 10 is a flowchart showing operations of a lamp pertaining to Embodiment.

Next, a description is given to, with reference to FIG. 10, the operations performed by the wireless circuit 50 to search for unused PAN-IDs.

First, the wireless circuit 50 broadcasts the beacon signal (Step S51).

Subsequently, the wireless circuit 50 receives the first ACK signal from a wireless LAN access point or the like, which belongs to the same network as the lamp A in which the wireless circuit 50 is included (Step S52). The wireless circuit 50 receives all the available PAN-IDs.

Subsequently, the wireless circuit 50 detects unused PAN-IDs that can be assigned to the lamp A (Step S53). The wireless circuit 50 selects one of the unused PAN-IDs, which are not used by any other devices.

Figure 11:
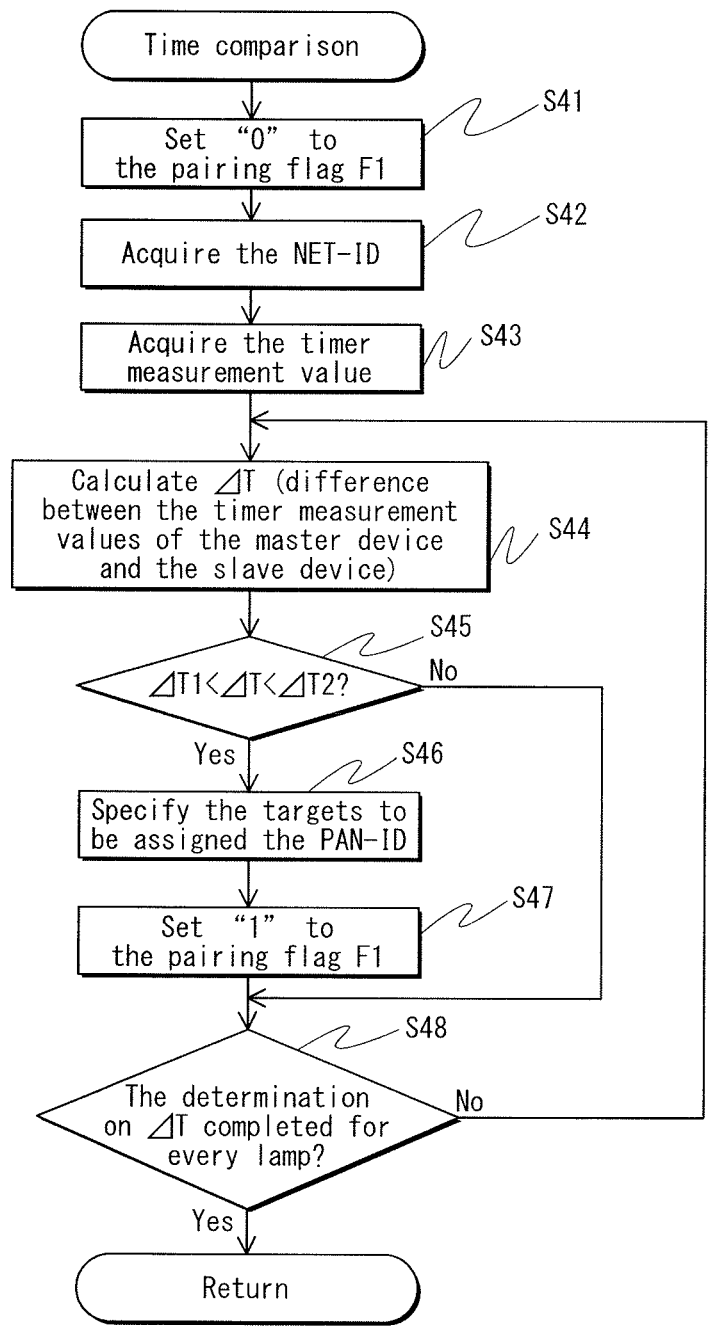
FIG. 11 is a flowchart showing operations of a lamp pertaining to Embodiment.
Figure 12:
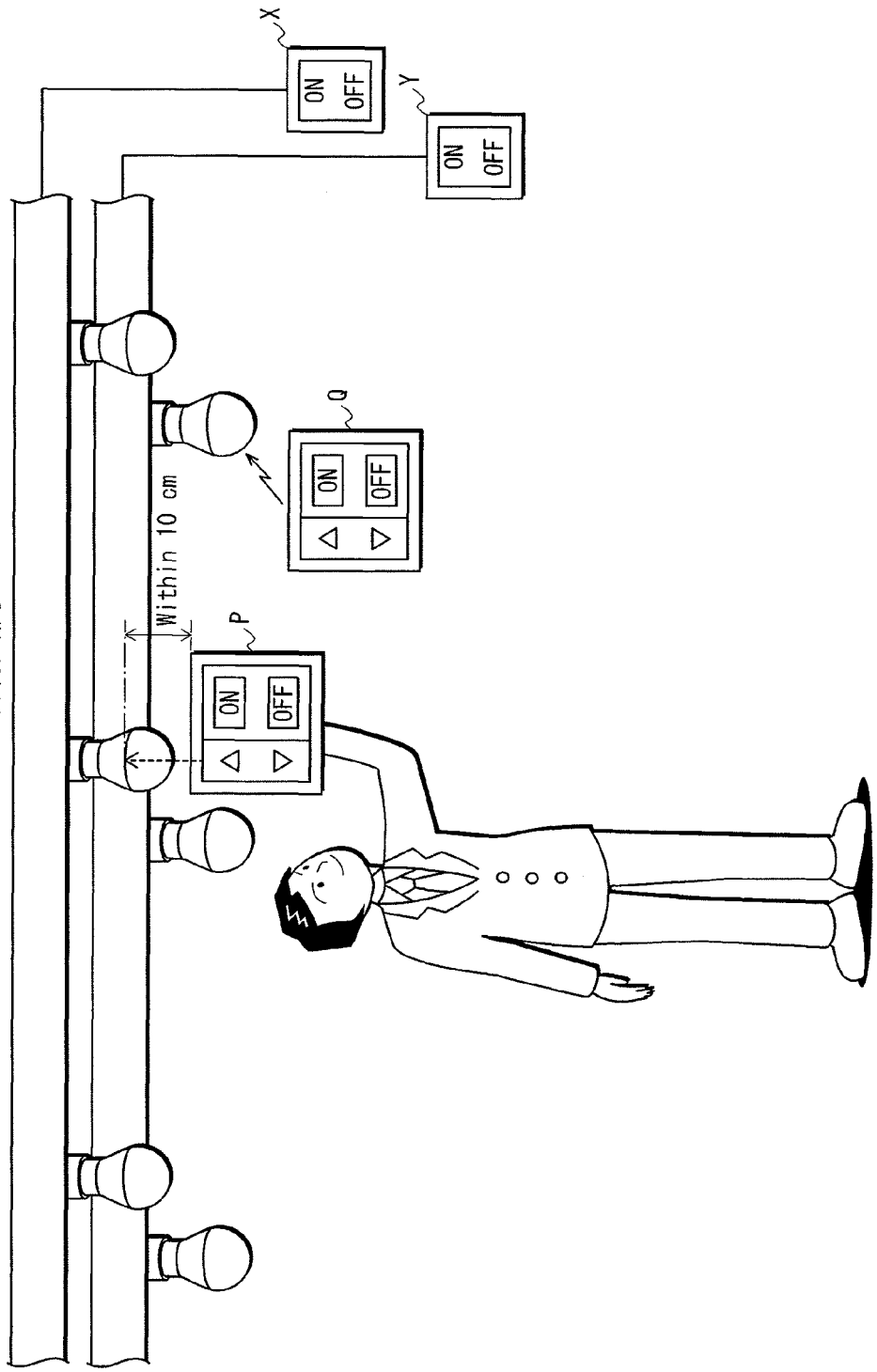
FIG. 12 illustrates operations of a wireless control system pertaining to a conventional technology.

<2-5> Operations for Time Comparison Processing Performed by Wireless Circuit of Lamp Serving as Master Device Next, a description is given to, with reference to FIG. 11, the operations for the time comparison processing performed by the wireless circuit 50 of the lamp 1 serving as the master device.

First, the wireless circuit 50 sets "0" to the pairing flag stored in the RAM 55 (Step S41). This pairing flag shows whether there is any lamp connected to the same wall switch as the lamp A.

Subsequently, the wireless circuit 50 acquires the PAN-ID of the lamp A stored in the RAM 55, the Net-ID of the lamps B and C serving as the slave devices, and the Net-ID of the lamp D (Step S42). The wireless circuit 50 also acquires the timer values of the lamp A and the lamps B, C and D as the slave devices (Step S43).

Subsequently, the wireless circuit 50 obtains the difference $\Delta T$ between the timer value of the lamp A and each of the timer values of the lamps B, C and D serving as the slave devices (Step S44).

Subsequently, the wireless circuit 50 determines whether the difference $\Delta T$ falls within a predetermined range ($\Delta T1 < \Delta T < \Delta T2$) (Step S45). This range may be set to $-1.0$ sec$<\Delta T<1.0$ sec, for example. Since the time values vary according to the performance of the CPUs 54 and 254, it is desired that the range is set according to the performance of the CPUs.

When determining in Step S45 that the difference $\Delta T$ falls within the predetermined range (Step S45: Yes), the wireless circuit 50 specifies the Net-IDs of the lamps (here, the lamps B and C) to which the PAN-ID is to be assigned (Step S46), and sets "1" to the pairing flag F1 (Step S47).

After that, the wireless circuit 50 determines whether the determination as to the difference $\Delta T$ has been completed for all the lamps (Step S48).

On the other hand, when determining in Step S45 that the difference $\Delta T$ does not fall within the predetermined range (Step S45: No), the wireless circuit 50 moves to Step S48.

When determining in Step S48 that the determination as to the difference $\Delta T$ has been completed for all the lamps B, C and D (Step S48: Yes), the wireless circuit 50 terminates the time comparison processing.

On the other hand, when determining in Step S48 that the determination as to the difference $\Delta T$ has not been completed for all the lamps (Step S48: No), the wireless circuit 50 returns to Step S44.

In summary, in the lighting system 1000 pertaining to the present embodiment, each of the lamps A, B and C has a wireless circuit 50 that realizes: a time measuring unit that measures the elapsed time period since the lamp is turned on by the wall switch X; a specifying unit that specifies the plurality of lamps A, B and C wired to the wall switch X according to the elapsed time period measured by the time measuring unit of each lamp; a PAN-ID assigning unit that assigns a same PAN-ID to the plurality of lamps A, B and C specified by the specifying unit as being wired to the same wall switch X; and a registration unit that registers the Net-ID of the remote control device. With the stated structure, the lamps A, B and C wired to the wall switch X and turned on with the same timing can be specified by simply turning on the wall switch X, and the remote control P can register the same PAN-ID assigned to the lamps A, B and C wired to the same wall switch X. Therefore, it is unnecessary to assign the ID to each of the plurality of lamps A, B and C wired to the same wall switch X. Thus the stated structure facilitates the assignment of the ID to the lamps A, B and C wired to the same wall switch X.

MODIFICATION EXAMPLES (1) According to Embodiment, the PAN-ID is assigned to each lamp every time the wall switch 3 is switched from off to on. However, this is not essential. For example, the following modification may be applied. That is, when the wall switch 3 is switched from off to on, each of the lamps 1 may store the assigned PAN-ID into the ROM 56, and simultaneously, the remote control 2 may store the PAN-ID assigned to the lamps 1 into the ROM 256. Accordingly, the subsequent operations for assigning the PAN-ID to each of the lamps 1 may be omitted even when the wall switch 3 is switched from off to on.

This modification reduces the work load on the wireless circuits 50 and 250 of the lamps and the remote control 2, and hence reduces the power consumption of the lamps 1 and the remote control 2.

(2) The wireless signal adopted in Embodiment uses the 2.4 GHz frequency band complying with the IEEE 802.15.4 standards. However, this is not essential. The wireless signal may use a different frequency band. For example, the frequency within the frequency band assigned to each region may be used. Specifically, the frequency bands from 433.05 MHz to 434.79 MHz and from 863 MHz to 870 MHz are available in Europe, the frequency bands from 426 MHz to 429 MHz and from 950 MHz to 956 MHz are available in Japan, and the frequency bands from 260 MHz to 470 MHz and 902 MHz to 928 MHz are available in the U.S., for example. The frequencies described above may be changed according to change in needs of the age.

(3) The devices included in the lighting system 1000 pertaining to Embodiment are lamps 1. However, this is not essential. For example, the wireless control system may include: a plurality of air conditioning devices having a wireless communication function; a plurality of remote controls; and a plurality of wall switches. In addition to lamps and air conditioning devices, any electrical devices having a wireless communication function may be used.

(4) According to Embodiment, the remote control P has a registration switch, and the remote control P outputs a registration request signal when the user presses the registration switch of the remote control P. However, this is not essential. For example, the remote control P may output the registration request signal when a "UP", "DOWN", "ON" or "OFF" switch of the remote control P is pressed or is pressed and held.

(5) According to Embodiment, the same PAN-ID is assigned to the plurality of lamps wired to the same wall switch. However, this is not essential. For example, different IDs may be assigned to the plurality of lamps (i.e. lamps A, B and C) wired to the same wall switch (e.g. the wall switch X) insofar as the lamps can be distinguished from lamps wired to other wall switches (e.g. the wall switch Y).

(6) According to Embodiment, the plurality of lamps (i.e. the lamps A, B and C) constitute a network having a cluster-tree topology. However, this is not essential. For example, the plurality of lamps may constitute a star or mesh network topology.

REFERENCE SIGNS LIST

1: Lamp
2: Remote control device (Remote control)
3: Wall switch
10: Power source circuit
20: Power converter circuit
30: Driver circuit
40: Light-emitting module
50, 250: Wireless circuit
54, 254: CPU
55, 255: RAM
56, 256: ROM 57, 257: Timer
60: Mount
70: Globe
80: Circuit unit
90: Housing
100: Utility power source
200: Battery
220: Key input unit
A1, A21: Antenna

The invention claimed is:

1. A wireless control system comprising: a plurality of electrical devices each having wireless transmission and reception functions; a remote control device wirelessly connected to, and controlling driving of, the plurality of electrical devices; and a plurality of power switches wired to, and turning on or off, the plurality of electrical devices, wherein each electrical device comprises:
 a time measuring unit configured to measure an elapsed time period since the electrical device is turned on by a power switch among the plurality of power switches;
 a specifying unit configured to specify, from among the plurality of electrical devices, another electrical device wired to the same power switch as the electrical device, according to elapsed time periods measured by the respective time measuring units of the plurality of electrical devices;
 an identification information assigning unit configured to assign identification information to said another electrical device specified as being wired to the same power switch as the electrical device, the identification information distinguishing said another electrical device from electrical devices connected to any other power switch among the plurality of power switches; and
 a registration unit configured to register the identification information assigned by the identification information assigning unit and identification information of the remote control device in association with each other, and
 and the specifying unit of each electrical device includes:
 a time information transmitter configured to transmit first time information to another electrical device among the plurality of electrical devices, the first time information indicating the elapsed time period measured by the time measuring unit of the electrical device;
 a time information receiver configured to acquire second time information from said another electrical device, the second time information indicating the elapsed time period measured by the time measuring unit of said another electrical device;
 a calculator configured to obtain a difference between the first time information and the second time information; and
 a determination unit configured to determine whether the difference falls within a reference range and,
 wherein, when the difference falls within the reference range, the identification information assigning unit assigns identification information of said another electrical device to the electrical device, and
 wherein the difference falling within the reference range is greater than −1.0 seconds and no greater than 1.0 seconds.

2. The wireless control system of claim 1, wherein at least one of the plurality of electrical devices serves as a master device that registers the identification information of the remote control device by using the registration unit thereof, and each of the rest of the plurality of electrical devices serves as a slave device.

3. The wireless control system of claim 2, wherein each electrical device further comprises:
 a function determination unit configured to determine whether the electrical device serves as the master device or the slave device.

4. The wireless control system of claim 1, wherein each of the plurality of electrical devices is a lamp having the wireless transmission and reception functions.

5. The wireless control system of claim 1, wherein the plurality of electrical devices constitute a network having a cluster-tree topology or a combination of a cluster-tree topology and another topology.

6. A wireless control system, comprising:
 a plurality of electrical devices each having wireless transmission and reception capabilities;
 a remote control device wirelessly connected to, and controlling driving of, the plurality of electrical devices; and
 a plurality of power switches wired to, and turning on or off, the plurality of electrical devices,
wherein each electrical device comprises:
 a timer configured to measure an elapsed time period since the electrical device is turned on by a power switch among the plurality of power switches;
 a specifying unit configured to specify, from among the plurality of electrical devices, another electrical device wired to the same power switch as the electrical device, according to elapsed time periods measured by the respective timer of the plurality of electrical devices;
 an identification information assigning unit configured to assign identification information to said another electrical device specified as being wired to the same power switch as the electrical device, the identification information distinguishing said another electrical device from electrical devices connected to any other power switch among the plurality of power switches; and
 a registrar configured to register the identification information assigned by the identification information assigning unit and identification information of the remote control device in association with each other;
wherein the specifying unit of each electrical device includes:
 a time information transmitter configured to transmit first time information to another electrical device among the plurality of electrical devices, the first time information indicating the elapsed time period measured by the timer of the electrical device;
 a time information receiver configured to acquire second time information from said another electrical device, the second time information indicating the elapsed time period measured by the timer of said another electrical device;
 a calculator configured to obtain a difference between the first time information and the second time information; and
 a determination unit configured to determine whether the difference falls within a reference range and,
 wherein, when the difference falls within the reference range, the identification information assigning unit assigns identification information of said another electrical device to the electrical device, and
 wherein the difference falling within the reference range is greater than −1.0 seconds and no greater than 1.0 seconds.

7. A wireless control system, comprising:
a plurality of electrical devices each having wireless transmission and reception capabilities;
a remote control device wirelessly connected to, and controlling driving of, the plurality of electrical devices; and
a plurality of power switches wired to, and turning on or off, the plurality of electrical devices, wherein
each electrical device is configured to perform operations comprising:
  measuring an elapsed time period since the electrical device is turned on by a power switch among the plurality of power switches;
  specifying, from among the plurality of electrical devices, another electrical device wired to the same power switch as the electrical device, according to elapsed time periods measured by the respective plurality of electrical devices;
  assigning identification information to the another electrical device, the identification information distinguishing the another electrical device from electrical devices connected to any other power switch among the plurality of power switches; and
  registering the identification information assigned to the another electrical device and identification information of the remote control device in association with each other;
  transmitting first time information to another electrical device among the plurality of electrical devices, the first time information indicating the elapsed time period measured by the electrical device;
  acquiring second time information from said another electrical device, the second time information indicating the elapsed time period measured by the another electrical device;
  obtaining a difference between the first time information and the second time information; and
  determining whether the difference falls within a reference range,
wherein, when the difference falls within the reference range, the electrical device assigns identification information of said another electrical device to the electrical device, and
wherein the difference falling within the reference range is greater than −1.0 seconds and no greater than 1.0 seconds.

8. The wireless control system of claim 7, wherein
at least one of the plurality of electrical devices serves as a master device that registers the identification information of the remote control device, and each of the rest of the plurality of electrical devices serves as a slave device.

9. The wireless control system of claim 8, wherein
each electrical device is further configured to perform an operation comprising determining whether the rest of the plurality of electrical device serves as the master device or the slave device.

10. The wireless control system of claim 7, wherein
each of the plurality of electrical devices is a lamp having the wireless transmission and reception capabilities.

11. The wireless control system of claim 7, wherein
the plurality of electrical devices constitute a network having a cluster-tree topology or a combination of a cluster-tree topology and another topology.

* * * * *